United States Patent [19]

Nagai

[11] 4,313,293

[45] Feb. 2, 1982

[54] CLUTCH-BRAKE DEVICE FOR CUTTING MACHINES

[75] Inventor: Shigeo Nagai, Ueda, Japan

[73] Assignee: Nissin Kogyo Kabushiki Kaisha, Nagano, Japan

[21] Appl. No.: 185,519

[22] Filed: Sep. 9, 1980

[30] Foreign Application Priority Data

Oct. 18, 1979 [JP] Japan ................... 54-134622

[51] Int. Cl.³ ............................................. A01D 69/10
[52] U.S. Cl. ................................... 56/11.3; 192/18 R
[58] Field of Search ............ 56/11.3; 192/18 R, 18 A, 192/18 B

[56] References Cited

U.S. PATENT DOCUMENTS

| | | | |
|---|---|---|---|
| 2,826,056 | 3/1958 | Bruckman | 192/18 R |
| 2,910,161 | 10/1959 | Conlee | 192/18 R |
| 2,985,992 | 5/1961 | Dowdle | 56/11.3 |
| 4,205,509 | 6/1980 | Miyazawa et al. | 192/18 R |
| 4,212,141 | 7/1980 | Miyazawa et al. | 56/11.3 |
| 4,213,521 | 7/1980 | Modersohn | 56/11.3 |
| 4,226,313 | 10/1980 | Meldahl et al. | 192/18 R |

*Primary Examiner*—Robert A. Hafer

*Attorney, Agent, or Firm*—Armstrong, Nikaido, Marmelstein & Kubovcik

[57] ABSTRACT

A clutch-brake device for cutting machines disclosed herein has a first cover secured to the bottom of the engine case and a second cover rotatably fitted over an output shaft which is connected to an engine and projects from the first cover. A cutting blade is secured to the bottom of the second cover. A brake plate and a clutch plate are provided immediately above and below a disk mounted on the output shaft for rotation therewith, and are connected together at their peripheries. The clutch plate is urged by a spring toward the disk. One of the clutch plate and the brake plate has a plurality of guide pieces projecting from the outer periphery thereof and slidably fitted into a plurality of axial recesses formed in the second cover. A brake lever is provided on the first cover immediately above the brake plate for rotation and axial sliding movement. The brake lever is urged by another spring to rotate relative to the first cover into a released condition so that the brake lever is moved down toward the brake and clutch assembly to place the latter into frictional engagement with the brake lever and at the same time out of engagement from the disk.

7 Claims, 3 Drawing Figures

CLUTCH-BRAKE DEVICE FOR CUTTING MACHINES

BACKGROUND OF THE INVENTION

1. Field of the Invention

This invention relates to a clutch-brake device for cutting machines such as lawn mowers and the like.

2. Description of the Prior Art

When the lawn mower is to be moved to a different site, the rotation of the cutting blades must be stopped for safety but the engine is kept running to avoid having to restart it.

To stop the rotation of the cutting blades while the engine is running, a clutch-brake device is used. The conventional clutch-brake device employing a centrifugal clutch-brake and a friction belt is complex in construction and large in size.

SUMMARY OF THE INVENTION

An object of this invention is to provide a clutch-brake device which is simple in construction and small in size.

BRIEF DESCRIPTION OF THE DRAWINGS

The accompanying drawings illustrate one embodiment of this invention.

DESCRIPTION OF THE PREFERRED EMBODIMENT

Figure 1:
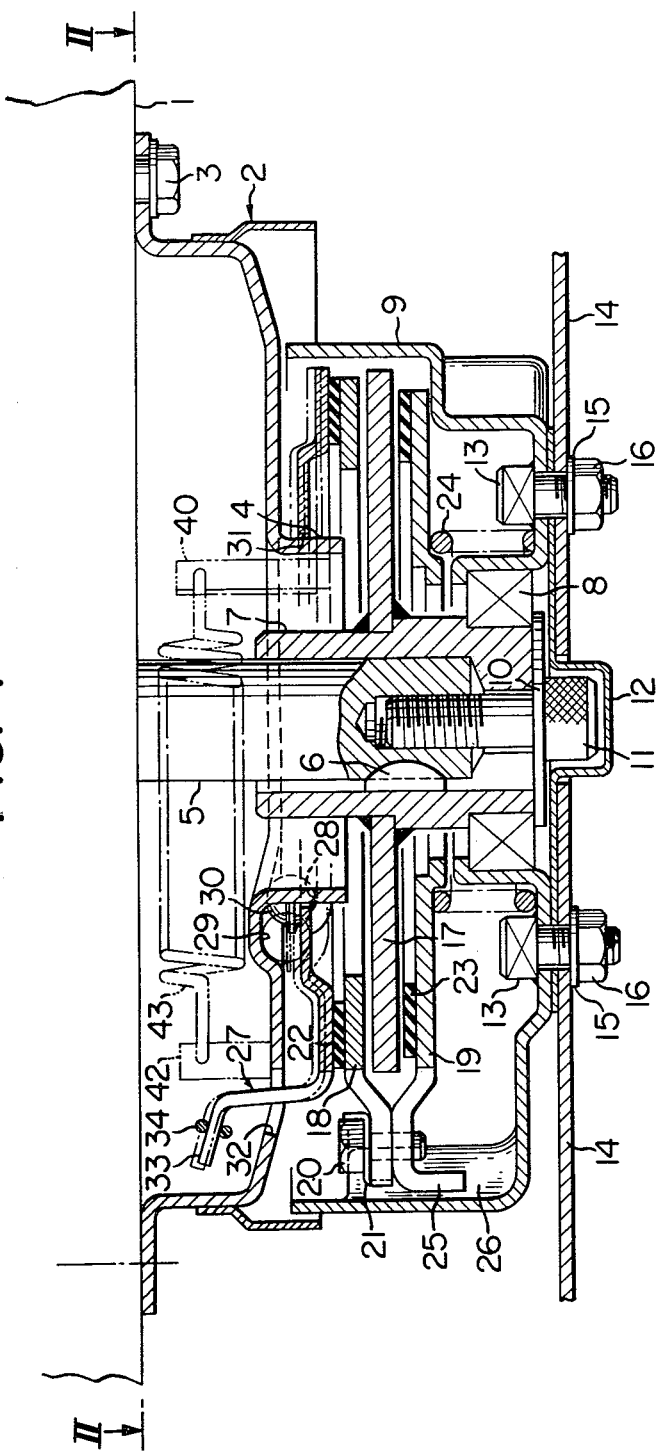
FIG. 1 is a vertical front cross section of the embodiment.

We will now explain one embodiment of this invention applied to a lawn mower with reference to the accompanying drawings.

Denoted by 1 is an engine case to the undersurface of which a first cover 2 is secured by a plurality of bolts 3. An output shaft 5 connected to the crank shaft of the engine projects downward from the central boss 4 of the first cover 2. The output shaft 5 has a sleeve 7 mounted and secured to the projected portion thereof through the key 6. A second cover 9 is rotatably mounted to the lower end of the sleeve 7 with a bearing 8 interposed between them. Attached to the undersurfaces of the sleeve 7 and bearing 8 is a retainer plate 10 through which a socket bolt 11 is screwed into the output shaft 5 to retain the sleeve 7 and the bearing 8 in their positions and prevent them from falling. A protective plate 12 is fitted to the undersurface of the second cover 9 to protect the bearing 8. Cutting blades 14 are secured to the underside of the second cover 9 by bolts 13 which penetrate the second cover 9, the protective plate 12 and the base portion of the cutting blade 14 from the inner side of the second cover 9 and are fastened with nuts 16 with a washer 15 interposed between the nut and the cutting blade.

A disk 17 is welded to the central portion of the sleeve 7 so that it will rotate with the sleeve 7. Disposed immediately above and below the disk 17 are a brake plate 18 and a clutch plate 19, respectively, both of them being secured together by a plurality of bolts 20 arranged equidistantly along the circumference of the brake and clutch plates. 21 represents a lock washer. The brake plate 18 has an annular friction member 22 on its upper surface. Likewise, the clutch plate 19 also has an annular friction member 23 on its upper surface. Interposed between the clutch plate 19 and the inner surface of the bottom of the second cover 9 is a compression coil spring 24 that urges the clutch plate 19 toward the disk 17.

The clutch plate 19 has a plurality of downwardly projecting guide pieces 25—in this example three in number—arranged equidistantly along the periphery and slidably inserted into three vertical or axial recesses 26 which are formed in the inner surface of the second cover 9.

Disposed immediately above the brake plate 18 is a brake lever 27 with a central opening 31 at which the brake lever 27 is loosely fitted over the boss 4 of the first cover 2 for rotation and vertically or axially sliding movement. There are three wedge-shaped recesses 28 and opposite wedge-shaped recesses 29, arranged in circle equidistantly on the upper surface of the brake lever 27 and on the undersurface of the first cover 2 to retain thrust balls 30 therein.

The upper end of the brake lever 27 is bent upward and passes through an arcuate slot 32 of the first cover 2 into the interior of the first cover 2. The upper end 33 of the brake lever 27 is connected, through a wire 34, to an operating lever 37 which is rotatably mounted by a shaft 36 on the machine body 35. 38 represents a seal member through which the wire 34 is passed and which separates the interior of the first cover 2 from the exterior; 39 is a stopper for the operating lever 37 provided on the machine body 35. The brake lever 27 is provided with a projection 40 protruding through an arcuate slot 41 in the first cover 2 into the interior of the first cover 2. A tensile coil spring 43 is stretched between the projection 40 and a member 42 secured to the first cover 2.

The spring 43, when the operating lever 37 is released, applies a braking action to the brake plate 18 and hence to the cutting blade 14 and at the same time disengages the clutch plate 19 from the disk 17 thereby disconnecting the cutting blade 14 from the output shaft 5.

Figure 2:
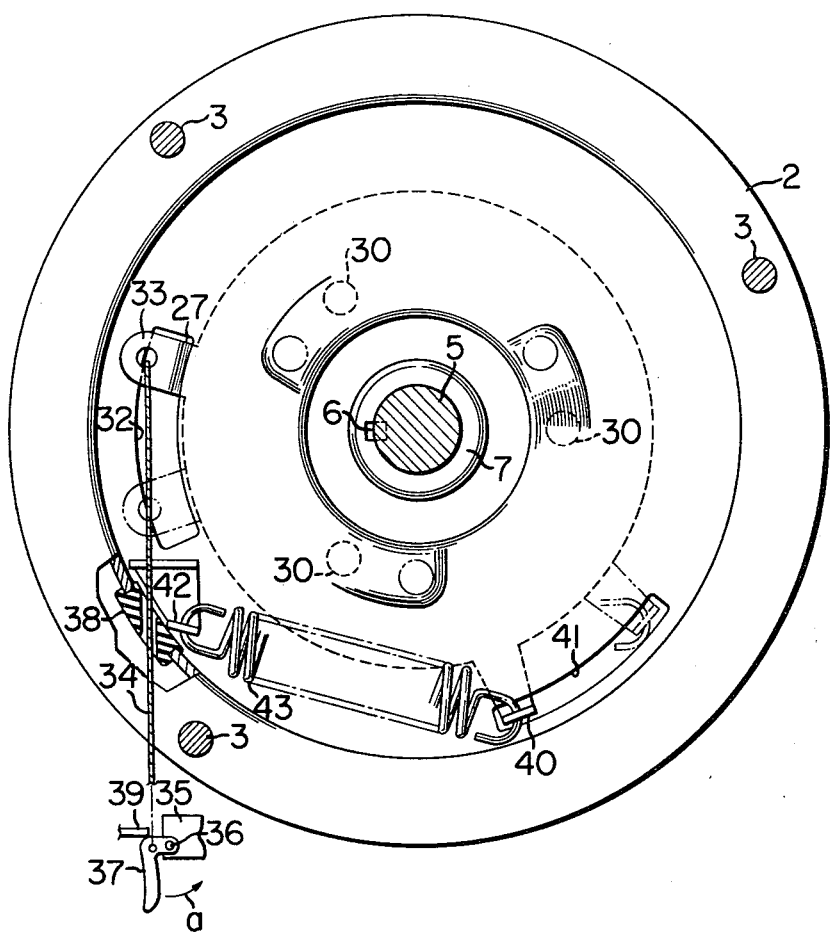
FIG. 2 is a cross section taken along the line II—II of FIG. 1.
Figure 3:
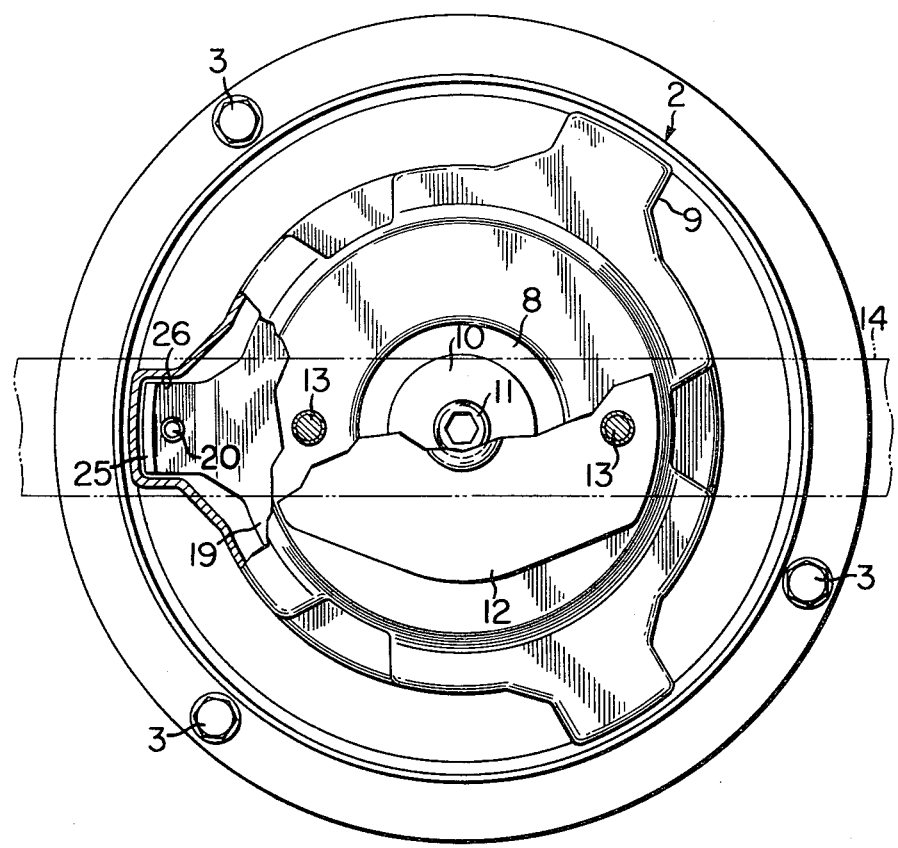
FIG. 3 is a bottom view partially cut away.

Now, the operation of this embodiment is as follows. When the tensile spring 43 is contracted as shown in FIGS. 1 and 2, the brake lever 27 is forced to rotate clockwise bringing its projection 40 into contact with one end of the slot 41 and the end 33 of the brake lever 27 comes near the end of the slot 32 tensing the wire 34. This causes the operating lever 37 to abut against the stopper 39. In other words the operating lever 37 assumes a released position. At this time, the opposing recesses 28, 29 come out of alignment as shown in FIG. 1, so that the thrust balls 30 are displaced toward the shallow portion of the recesses. This forces the brake lever 27 downward to press against the brake plate 18, causing the brake plate 18 and the clutch plate 19 to move down thus disengaging the clutch plate 19 from the disk 17. With the clutch plate 19 disengaged, the rotation of the output shaft 5 and the disk 17 is not transmitted to the cutting blade 14.

When the cutting blade 14 is to be driven, the operating lever 37 is rotated in the direction of the arrow a. The brake lever 27 will then rotate counterclockwise against the tension of the spring 43 until the wedge-shaped recesses 28, 29 come into alignment. Since the brake lever 27 is displaced upward by the tension of the spring 43, the thrust balls 30 move to the deeper portion of the recesses 28, 29 with the result that the brake lever 27 is moved away from the surface of the friction member 22 of the brake plate 18. Then, the compression spring 24 causes the clutch plate 19 to move up with its guide pieces 25 sliding upward along the recesses 26 of the second cover 26 until the friction member 23 presses against the undersurface of the disk 17. With the clutch plate 19 engaged, the rotary force of the output shaft 5 is transmitted, through the sleeve 7, disk 17, clutch plate 19, guide pieces 25 and recesses 26, to the second cover 9 thereby rotating the cutting blade 14.

When the operating lever 37 is released, the brake lever 27 is rotated clockwise by the tension of the tensile spring 43. This displaces the brake lever 27 downward pressing its undersurface against the friction member 22 of the brake plate 18, which in turn causes the clutch plate 19 to come apart from the disk 17 bringing the cutting blade to a quick stop.

The guide pieces 25 may be provided on the brake plate 18 instead of the clutch plate 19.

As can be seen in the foregoing, the clutch-brake device according to this invention is simple in construction and small in size because of the following features: all the components are contained in the first and second covers; the clutch plate, the disk connected to the output shaft, the brake plate secured to the clutch plate, and rotatable and vertically slidable brake lever are stacked one over the other; and the vertical displacement of the movable components can be set very small. This device is safe in operation because releasing of the operating handle automatically stops the rotation of the cutting blade by the action of the tensile spring. Furthermore, since the transmission of the driving force and braking force from the clutch plate or brake plate to the second cover is effected through the plurality of guide pieces, which are integral part of the clutch plate and brake plate, and the recesses formed in the second cover in which the guide pieces are received, not only can the construction be made simple but the driving and braking forces can be transmitted in a positive and effective manner.

What is claimed is:

1. A clutch-brake device for cutting machines comprising: an engine case; a first cover secured to said engine case; an output shaft connected to an engine and projecting outwardly from said engine case through said first cover; a second cover rotatably mounted on said output shaft; a cutting blade secured to said second cover; a disk connected to said output shaft for rotation therewith; a brake and clutch assembly mounted on said output shaft for rotation and axial movement, said assembly including a brake plate and a clutch plate disposed in parallel with each other with said disk interposed therebetween, said brake and clutch plates being connected with each other at their radially outer peripheral portions; a plurality of axial recesses formed in said second cover; a plurality of guide pieces projecting from said brake and clutch assembly and being in axially slidable but non-rotatable engagement with said recesses in said second cover for driving connection between said brake and clutch assembly and said second cover; first means for urging said brake and clutch assembly into frictional driving engagement with said disk; a brake lever provided on said first cover for rotation and axial sliding movement and disposed between said first cover and said brake and clutch assembly in opposing relation to the latter; and second means for urging said brake lever to rotate relative to said first cover into a released condition so that said brake lever is moved away from said brake and clutch assembly to place the latter into frictional engagement with said disk and at the same time out of engagement with said brake lever; said second cover enclosing said disk, said brake and clutch assembly, and said first means for preventing the entrance of external substances as cut by said cutting blade.

2. A device as defined in claim 1 wherein said means for urging said brake and clutch assembly into frictional driving engagement with said disk comprises a spring disposed between said second cover and said clutch plate; said means for urging said brake lever to rotate relative to said first cover comprising a spring connected between said brake lever and said first cover; a plurality of paired wedge-shaped recesses formed in the opposing surfaces of said brake lever and said first cover, each pair of said recesses being in alignment with each other when said brake lever is in a non-released position; thrust balls held between said paired recesses; said brake lever being loosely fitted over a central boss of said first cover; said brake lever having a projection received in an arcuate slot formed in said first cover.

3. A clutch-brake device as set forth in claim 1, wherein said means for urging said brake and clutch assembly into frictional driving engagement with said disk comprises a spring disposed between said second cover and said clutch plate.

4. A clutch-brake device as set forth in claim 1, wherein said means for urging said brake lever to rotate relative to said first cover comprises a spring connected between said brake lever and said first cover.

5. A clutch-brake device as set forth in claim 3, further comprising: a plurality of paired wedge-shaped recesses formed in the opposing surfaces of said brake lever and said first cover, each pair of said recesses being in alignment with each other when said brake lever is in a non-released condition; and thrust balls held between said paired recesses.

6. A clutch-brake device as set forth in claim 1, wherein said brake lever is loosely fitted over a central boss of said first cover.

7. A clutch-brake device as set forth in claim 1, wherein said brake lever has a projection received in an arcuate slot formed in said first cover.

* * * * *